United States Patent [19]
Stumpo et al.
[11] 3,898,191
[45] Aug. 5, 1975

[54] PLASTICIZED SULFUR MORTAR AND METHOD FOR MAKING SAME

[76] Inventors: Anthony J. Stumpo, 829 Medway Rd., Philadelphia, Pa. 19115; David Warren Neff, 802 Irene Dr., West Chester, Pa. 19380

[22] Filed: May 24, 1974

[21] Appl. No.: 473,117

Related U.S. Application Data

[63] Continuation of Ser. No. 271,862, July 14, 1972, abandoned.

[52] U.S. Cl..................... 260/37 R; 241/22; 241/23
[51] Int. Cl........................................... C08g 51/04
[58] Field of Search...... 260/37 R; 241/23, DIG. 28, 241/16, 22, DIG. 13; 106/287

[56] References Cited

UNITED STATES PATENTS

| | | | |
|---|---|---|---|
| 3,190,565 | 6/1965 | Jayne | 241/22 |
| 3,290,266 | 12/1966 | Barnes et al. | 260/30.8 |
| 3,316,115 | 4/1967 | Barnes et al. | 106/287 |
| 3,447,941 | 6/1969 | Kane | 106/287 SC |

FOREIGN PATENTS OR APPLICATIONS

| | | | |
|---|---|---|---|
| 675,522 | 12/1963 | Canada | 241/16 |
| 1,236,365 | 6/1971 | United Kingdom | 241/23 |

*Primary Examiner*—Lewis T. Jacobs

[57] ABSTRACT

A plasticized sulfur mortar in which the polysulfide rubber plasticizer is first frozen and then ground in the frozen state for blending with the sulfur and inert filler so that distribution can be effected in granular form.

5 Claims, No Drawings

PLASTICIZED SULFUR MORTAR AND METHOD FOR MAKING SAME

This is a continuation of application Ser. No. 271,862, filed July 14, 1972, now abandoned.

This invention relates to sulfur mortars, and more particularly relates to a sulfur mortar composition and an improved method for making the same.

Sulfur mortars, because of their acid-proof characteristics, are commonly used for bonding brick or tile and for sealing bell-and-spigot pipe which are subject to exposure to acidic environment. These sulfur-based mortars are commonly of the "melt and pour type" since they are usually sold in ingots or briquettes which are melted down at the site for pouring into the crevices, cracks or interstices of the installation. The composition of these sulfur mortars usually comprises approximately 55 to 70 percent sulfur, 45 to 35 percent inert filler in the form of silica sand or carbon black and about 1 to 5 percent of a plasticizer, such as a polysulfide or polymercaptan, usually in the form of an elastomeric mass. The sulfur-containing rubber plasticizers alleviate the tendency of molten sulfur to crystallize upon cooling thereby creating a flexible compound which does not crack upon expansion or contraction due to temperature changes.

In the past, the procedure for fabricating the sulfur mortar bricks had been to melt down the sulfur crystals in a large open vessel, for example a jacketed or electrically heated kettle operating at approximately 280° to 300°F, until a dark brown viscous mass was obtained. The prescribed amount of inert filler was added slowly accompanied by stirring, and finally diced bits or chunks of the very nervy polysulfide or polymercaptan plasticizer incorporated. The molten mass was heated and constantly stirred until uniform, then cast into molds and allowed to cool preparatory to shipment as ingots or bricks to the site. The sulfur mortar may also be prepared in the form of flakes by chill cooling the molten sulfur mass upon cold rollers.

As is well known, the melting of the sulfur mass is a messy, pervasive and most unpleasant operation, especially when the sulfur fumes combine with the foul smelling polysulfides or polymercaptans. The meltdown operation produces considerable emissions which pollute the atmosphere and create opprobrious working conditions.

The present invention completely eliminates the initial steps of melting down the sulfur with the filler and plasticizers. Instead, the sulfur is dry blended with the inert filler and plasticizer, and then the mortar is shipped in granular form in bags or in bulk to the point of installation whereat the desired quantity may be melted down in small vessels conveniently and quickly.

It is therefore an object of this invention to provide a method for making a sulfur mortar in which the sulfur and the inert filler are combined with the plasticizer all in dry granular form.

Another object of this invention is to provide a sulfur mortar composition in dry granular form which may be shipped to the site in convenient size bags.

Another object of this invention is to provide a method for making a sulfur mortar which leads to considerable saving of time, results in reduction of ecological problems, and generally enhances working conditions.

Other objects of this invention are to provide an improved composition and method of the character described that is economically produced and highly efficient and effective in nature.

With the foregoing objects in view, this invention consists of the details of operation and combination of components as will be more fully understood from the following detailed description. However, in essence, the basic concept of the invention resides in the freezing of the polysulfide or polymercaptan rubber plasticizer until the amorphous and sinewy mass becomes embrittled and transformed into a friable state. In its frangible condition, the plasticizer may be pulverized and reduced to granules or a powder which can be blended conveniently with the granules of sulfur and inert filler.

The following examples are illustrative of the improved product and method of fabrication:

EXAMPLE I

Approximately 100 grams of a polysulfide rubber, Thiokol A, an ethylene tetrasulfide polymer made by Thiokol Chemical Corporation, of Trenton, New Jersey, was immersed in liquid nitrogen within a vessel until the bubbling died down. The frozen mass was then removed from the freezant and dusted with 100 mesh silica flour to prevent blocking. While still in a frozen state, the mass was repeatedly struck with a hammer and the pieces dusted with the silica flour until thoroughly granulated.

The granulated polysulfide after returning to room temperature was then mixed with about 5000 grams of sulfur and 4000 grams of silica sand until thoroughly blended. The dry granulated sulfur mortar was then melted in a cast iron pot and heated to about 280°F. Tests on the molten sulfur mortar following the procedures of ASTM No. 287 were satisfactory.

EXAMPLE II

Approximately 100 pounds of cut pieces of Thiokol A polysulfide rubber were introduced into a micropulverizer mill which had been previously cooled down by running dry ice therethrough. About 1 pound of fine silica flour and about 20 pounds of dry ice were then put into the mill and the mixture ground to under 100 mesh size. The silica-dusted granulated polysulfide was then set aside for storage and later blended with sulfur and inert ingredients in the following proportions.

| | Parts by Weight | | |
|---|---|---|---|
| | A | B | C |
| Silica sand | 42.5 | — | 41.97 |
| Carbon (coke) | — | 44.88 | — |
| Sulfur | 54.84 | 54.84 | 54.84 |
| Carbon black | 2.00 | — | 2.00 |
| THIOKOL A | .60 | .60 | 1.20 |

After the ground polysulfide plasticizer was thoroughly dispersed within each of the foregoing mixes, the mortar was melted down and the molten sulfur cement tested in accordance with the prescribed ASTM standards. Complete conformity with the standards was observed in all cases.

As is apparent, the frozen granulated polysulfide plasticizer may be stored at room temperature and may be shipped in bulk for mixing with the sulfur and inert filler at the site or may be blended into formulations as desired and packaged as an already mixed sulfur mortar. In either case, the user is free to utilize as much of the powdered pre-mix as he desires for melting at the site only.

Although this invention has been described in considerable detail, such description is intended as being illustrative rather than limiting, since the invention may be variously embodied without departing from the spirit thereof, and the scope of the invention is to be determined as claimed.

What is claimed is:

1. A sulfur mortar consisting essentially of about 55 to 70 parts by weight of sulfur in dry granular form, about 45 to 35 parts by weight of an inert filler in dry granular form, and about 1 to 5 parts polysulfide rubber plasticizer in dry finely divided particulate form produced by freezing a nervy mass of said polysulfide rubber plasticizer into an embrittled mass and grinding said embrittled mass into discrete granules in the presence of a dusting flour, all blended into a homogeneous granular free-flowing dry mixture.

2. The mortar of claim 1 wherein the inert filler is silica sand or carbon black.

3. A method for making a sulfur mortar comprising the steps of exposing a nervy elastomeric mass of a polysulfide rubber to a sufficiently low temperature until it is in a frozen and embrittled condition, grinding the frozen and embrittled mass in the presence of a dusting flour until in a finely divided, dry particulate form and after the dusted particles have come to room temperature, blending about 1 to 5 parts by weight of the particulate polysulfide rubber with about 55 to 70 parts by weight of dry granular sulfur and about 45 to 35 parts by weight of granular inert filler to form a free-flowing dry mixture.

4. The method of claim 3 wherein selective quantities of the dry free-flowing mixture are melted and poured to define a cast mortar.

5. The method of claim 3 wherein the inert filler is selected from the class consisting of silica sand and carbon black.

* * * * *